(12) United States Patent
Lipton et al.

(10) Patent No.: US 10,204,097 B2
(45) Date of Patent: Feb. 12, 2019

(54) EFFICIENT DIALOGUE POLICY LEARNING

(71) Applicant: Microsoft Technology Licensing, LLC, Redmond, WA (US)

(72) Inventors: Zachary Chase Lipton, San Diego, CA (US); Jianfeng Gao, Redmond, WA (US); Lihong Li, Redmond, WA (US); Xiujun Li, Redmond, WA (US); Faisal Ahmed, Redmond, WA (US); Li Deng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/619,314

(22) Filed: Jun. 9, 2017

(65) Prior Publication Data

US 2018/0052825 A1    Feb. 22, 2018

Related U.S. Application Data

(60) Provisional application No. 62/375,853, filed on Aug. 16, 2016.

(51) Int. Cl.
*G06F 17/27* (2006.01)
*G06N 3/00* (2006.01)

(52) U.S. Cl.
CPC ........ *G06F 17/2785* (2013.01); *G06F 17/279* (2013.01); *G06N 3/00* (2013.01)

(58) Field of Classification Search
USPC ........................... 704/1, 9, 10, 257, 270–275
See application file for complete search history.

(56) References Cited

U.S. PATENT DOCUMENTS

| | | |
|---|---|---|
| 8,972,253 B2 | 3/2015 | Deng et al. |
| 2015/0179170 A1* | 6/2015 | Sarikaya ................. G10L 15/22 704/275 |

(Continued)

OTHER PUBLICATIONS

Leike, et al., "Thompson Sampling is Asymptotically Optimal in General Environments", In Proceedings of the Thirty-Second Conference on Uncertainty in Artificial Intelligence, Jun. 25, 2016, 12 pages.

(Continued)

*Primary Examiner* — Jesse S Pullias
(74) *Attorney, Agent, or Firm* — Workman Nydegger

(57) ABSTRACT

Efficient exploration of natural language conversations associated with dialogue policy learning may be performed using probabilistic distributions. Exploration may comprise identifying key terms associated with the received natural language input utilizing the structured representation. Identifying key terms may include converting raw text of the received natural language input into a structured representation. Exploration may also comprise mapping at least one of the key terms to an action to be performed by the computer system in response to receiving natural language input associated with the at least one key term. Mapping may then be performed using a probabilistic distribution. The action may then be performed by the computer system. A replay buffer may also be utilized by the computer system to track what has occurred in previous conversations. The replay buffer may then be pre-filled with one or more successful dialogues to jumpstart exploration.

19 Claims, 2 Drawing Sheets

(56) References Cited

U.S. PATENT DOCUMENTS

2016/0322050 A1* 11/2016 Wang .................. G10L 15/22
2017/0316777 A1* 11/2017 Perez .................. G06F 17/279

OTHER PUBLICATIONS

Vinyals, et al., "Matching Networks for One Shot Learning", In Proceedings of Computing Research Repository, Jun. 2016, pp. 1-12.

Zhang, et al., "Enhancing performance of the backpropagation algorithm via sparse response regularization", In Journal of Neurocomputing, vol. 153, Apr. 4, 2015, pp. 20-40.

Li, et al., "Recurrent Reinforcement Learning: A Hybrid Approach", In Proceedings of International Conference on Learning Representations, May 2, 2016, pp. 1-11.

Ong, et al., "Distributed Deep Q-Learning", In Proceedings of Computing Research Repository, Aug. 2015, pp. 1-8.

Zilka, Lukas, "Dialog Management with Deep Neural Networks", In Doctoral Dessertation, Retrieved on: Aug. 16, 2016, 20 pages.

Mohamed, et al., "Deep Belief Networks for phone recognition", In Proceedings of N23rd Annual Conference on Neural Information Processing System, Dec. 7, 2009, pp. 1-9.

Deng, et al., "Ensemble Deep Learning for Speech Recognition", In Proceedings of 15th Annual Conference of the International Speech Communication Association, Sep. 14, 2014, 5 pages.

Perez, Julien, "Dialog state tracking, a machine reading approach using a memory-enhanced neural network", In Proceedings of Computing Research Repository, Jun. 2016, pp. 1-19.

* cited by examiner

EFFICIENT DIALOGUE POLICY LEARNING

CROSS-REFERENCE TO RELATED APPLICATIONS

This application claims the benefit of U.S. Provisional application 62/375,853 filed Aug. 16, 2016, titled "EFFICIENT EXPLORATION FOR DIALOG POLICY LEARNING WITH DEEP BBQ NETWORKS AND REPLAY BUFFER SPIKING", which is incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

Enabled by improvements in automatic speech recognition and the ubiquity of instant messaging services, people increasingly interact with computers via automated dialogue interfaces. Currently, simple question answering (QA) bots are installed into computer products, such as personal computers, mobile devices, and so forth. These QA bots typically carry out conversations consisting of a single exchange, which can be programmed with explicit policies. However, these single exchange QA bots are generally not capable of competing tasks or carrying out dialogue as a human would.

The subject matter claimed herein is not limited to embodiments that solve any disadvantages or that operate only in environments such as those described above. Rather, this background is only provided to illustrate one exemplary technology area where some embodiments descried herein may be practiced.

BRIEF SUMMARY

At least some embodiments described herein relate to performing efficient exploration of natural language conversations associated with dialogue policy learning. For example, embodiments may include performing a number of acts in response to receiving natural language input. Embodiments may include identifying key terms associated with the received natural language input. Identifying key terms may include converting raw text of the received natural language input into a structured representation. Embodiments may further include performing exploration of a natural language conversation associated with the received natural language input. Exploration may comprise at least mapping at least one of the key terms to an action to be performed by the computer system in response to receiving the natural language input associated with the at least one key term. Mapping may be performed using a probabilistic distribution. Embodiments may further include performing the action.

Accordingly, instead of using a single value for weights, the principles described herein utilize probabilistic distributions for each weight during training, thus incorporating uncertainty information that allows for more intelligent exploration choices made by an agent (e.g., the dialogue policy engine 226), as further described herein. Notably, both a current network and a target network are described that allow for dynamically updating the probabilistic distribution of weights of the current network based on the target network. More specifically, probabilistic distributions for weights are used to calculate potential output distributions of values, which output values are used to determine an action to be taken. As such, training may be used to narrow the probabilistic distribution of the weights over time to thereby narrow the probabilistic distribution of the outputs, thus giving more certainty to the system (e.g., the natural dialogue computer system 220) of the appropriate action to take based on what has been identified during a conversation.

Aditionally, a replay buffer (which tracks all previous experiences (e.g., conversations) to allow those experiences to be used to update weights of the dialogue policy engine used in exploration) may be jump started upon initialization of exploration using replay buffer spiking (RBS). More specifically, RBS may be used to initialize data of the replay buffer such that the initial data is reasonable to start exploration. Upon performing RBS, exploration performed using the initially useful data may allow for quantifying uncertainty to thereby collect further useful data and avoid reward sparsity.

This Summary is provided to introduce a selection of concepts in a simplified form that are further described below in the Detailed description. This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
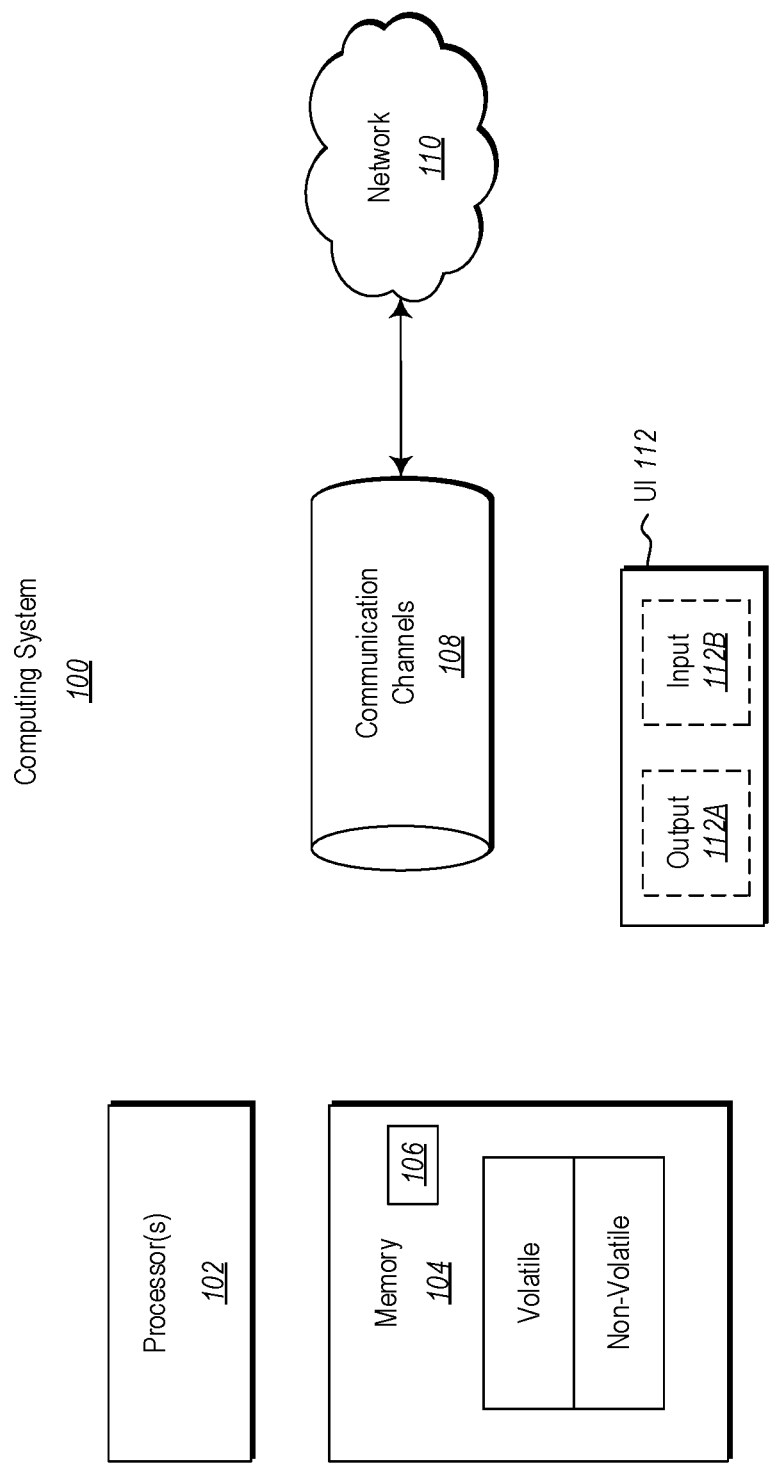
FIG. 1 illustrates an example computer architecture that facilitates operation of the principles described herein.

At least some embodiments described herein relate to performing efficient exploration of natural language conversations associated with dialogue policy learning. For example, embodiments may include performing a number of acts in response to receiving natural language input. Embodiments may include identifying key terms associated with the received natural language input. Identifying key terms may include converting raw text of the received natural language input into a structured representation. Embodiments may further include performing exploration of a natural language conversation associated with the received natural language input. Exploration may comprise at least mapping at least one of the key terms to an action to be performed by the computer system in response to receiving the natural language input associated with the at least one key term. Mapping may be performed using a probabilistic distribution. Embodiments may further include performing the action.

Accordingly, instead of using a single value for weights, the principles described herein utilize probabilistic distributions for each weight during training, thus incorporating uncertainty information that allows for more intelligent exploration choices made by an agent (e.g., the dialogue policy engine 226), as further described herein. Notably, both a current network and a target network are described that allow for dynamically updating the probabilistic distribution of weights of the current network based on the target network. More specifically, probabilistic distributions for weights are used to calculate potential output distributions of values, which output values are used to determine an action to be taken. As such, training may be used to narrow the probabilistic distribution of the weights over time to thereby narrow the probabilistic distribution of the outputs, thus giving more certainty to the system (e.g., the natural dialogue computer system 220) of the appropriate action to take based on what has been identified during a conversation.

Additionally, a replay buffer (which tracks all previous experiences (e.g., conversations) to allow those experiences to be used to update weights of the dialogue policy engine used in exploration) may be jump started upon initialization of exploration using RBS. More specifically, RBS may be used to initialize data of the replay buffer such that the initial data is reasonable to start exploration. Upon performing RBS, exploration performed using the initially useful data may allow for quantifying uncertainty to thereby collect further useful data and avoid reward sparsity.

Some introductory discussion of a computing system will be described with respect to FIG. 1. Then performing efficient exploration of natural language conversations associated with dialogue policy learning will be described with respect to FIGS. 2 and 3.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
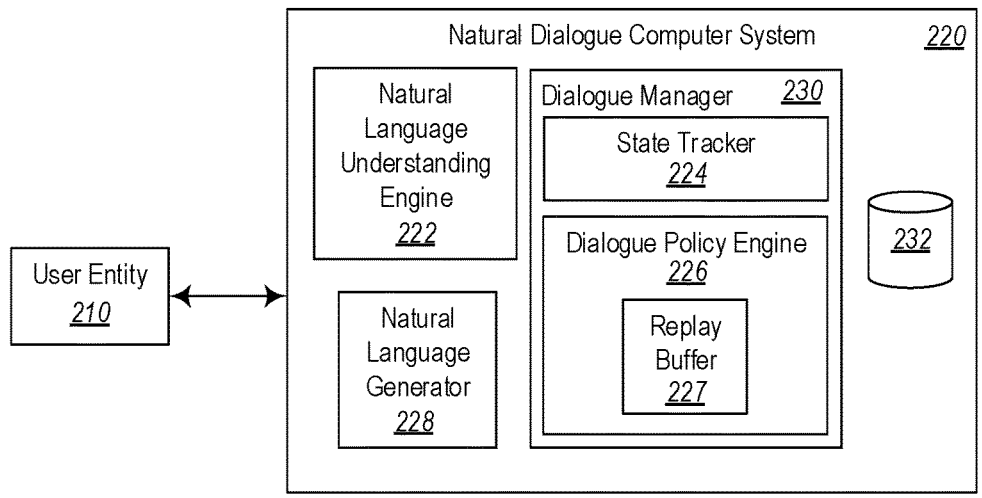
FIG. 2 illustrates an example environment for performing efficient exploration of natural language conversations associated with dialogue policy learning.

FIG. 2 illustrates an exemplary environment 200 for a natural dialogue computer system 220 that is capable of receiving natural language (e.g., words spoken in the English language), interpreting the received natural language, and responding to the received natural language with generated natural language, when appropriate. As illustrated, the environment 200 includes a user entity 210. The user entity may comprise a computer system (e.g., a desktop computer, a laptop computer, a smartphone, a tablet, and so forth) that is capable of generating or simulating natural language speech (e.g., words spoken in the English language via speakers). In other embodiments, the user entity may comprise a person that is capable of communicating with the natural dialogue computer system 220.

As briefly described, the environment 200 also includes the natural dialogue computer system 220. As illustrated, the natural dialogue computer system includes a natural language understanding engine 222, a dialogue manager 230, a state tracker 224, a dialogue policy engine 226, a natural language generator 228, and a database 232. Accordingly, the natural dialogue computer system 220 includes various engines and/or functional blocks (e.g., a natural language understanding engine 222, a state tracker 224, and so forth) that may be used for receiving, interpreting, and responding to natural language dialogue, as further described herein. The various engines and/or functional blocks of the natural dialogue computer system may be implemented on a local computer system or may be implemented on a distributed computer system that includes elements resident in the cloud or that implement aspects of cloud computing. The various engines and/or functional blocks of the natural dialogue computer system may be implemented as software, hardware, or a combination of software and hardware.

Notably, the natural dialogue computer system may include more or less than the engines illustrated in FIG. 2. Accordingly, some of the engines and/or functional blocks may be combined or separated as circumstances warrant. For instance, the natural language understanding engine 222 and the state tracker 224 may be combined into a single engine that performs the functions of both functional blocks. Although not illustrated, the various engines of the natural dialogue computer system may access and/or utilize a processor and memory, such as the processor 102 and the memory 104 of FIG. 1, as needed to perform their various functions. Furthermore, while a particular natural dialogue computer system (i.e., the computer system 220) is illustrated herein (i.e., in FIG. 2), the principles described herein may be practiced with essentially any type of natural dialogue computer system. For instance, a natural dialogue computer system that includes integrating several portions of the system via more end-to-end machine learning agents or speech-to-text components may also be used to practice the principles described herein.

The natural language understanding engine 222 may convert raw text received from the user entity 210 and convert that received raw text into any appropriate structured representation. For example, when the natural dialogue computer system 220 receives speech input from the user entity 210, the natural language understanding engine may interpret the received speech (i.e., raw text) and convert the received speech into an appropriate structured representation. Each utterance (e.g., each time speech is received as input at the natural dialogue computer system) may then be represented as a single act. Furthermore, each utterance may be treated as a collection of (slot=value) pairs. For instance, each utterance may be represented as a tuple that includes a single act and a collection of (slot=value) pairs.

For instance, assume that the following utterance was received at the natural language dialogue computer system, "I'd like to see Our Kind of Traitor tonight in Seattle." Such an utterance may then be mapped by the natural language understanding engine 222 to the following structured representation—an act that comprises a "request" that includes (slot=value pairs) of "(ticket, moviename=Our Kind of Traitor, starttime=tonight, city=Seattle)", which together comprises request(ticket, moviename=Our Kind of Traitor, starttime=tonight, city=Seattle). Notably, some slots may not be paired with a value, as illustrated by the ticket slot in the previous example. Accordingly, the natural language understanding engine may have a number of pre-determined slots (e.g., movie names, start times, city, and so forth) for which the natural language understanding engine will attempt to determine an associated value (e.g., value of Seattle for slot of city) that is received.

Once the structured representation has been created for a particular utterance, the structure representation may be passed to the dialogue manager 230 (and more specifically, the state tracker 224). As illustrated, the dialogue manager 230 includes both the state tracker 224 and the dialogue policy engine 226. The state tracker 224 may be configured to both identify which slots have been filled (i.e., for which slots has input been received), as well as maintain a record corresponding to which slots have been filled. For instance, assume the user entity 210 is attempting to book a movie using the natural dialogue computer system 220. In such an example, the state tracker may identify slots such as movie name, start time, number of tickets to be purchased, date, location of movie theater, and so forth. The state tracker may further be configured to interact with the database 232 to ascertain various information about the received utterances (i.e., acts, slot=value pairs, and so forth). As such, the database 232 may include various information (e.g., key terms, acts, slots, values, and so forth) about possible natural language dialogue to be received as input. In an example, the state tracker may interact with the database to ascertain how many movies match current constraints (i.e., as identified within a current received utterance). The state-tracker may also abstract away information about precise values associated with slots, thus enabling the dialogue policy engine 226 to act upon more generic, de-lexicalized representations that are concerned with intents and slots rather than values. Accordingly, in some embodiments, such generic states may not include precise values.

Given a representation of the current conversation state provided by the state tracker, the dialogue policy engine may choose from a plurality of pre-determined actions with which to respond to a received utterance input. Accordingly, the dialogue policy engine 226 may then have access to a plurality of predetermined actions that each comprise a complete structured utterance (i.e., to be used in response to a received utterance). For instance, such actions may include greeting, denying, confirming a question, confirming an answer, closing, and so forth. Notably, acts and actions as described herein may be separately defined. More specifically, acts are identified by the state tracker within utterances received from the user entity 210, while actions comprise a plurality of predetermined actions that both the natural dialogue computer system may perform in response to a received utterance and that are mapped to acts/slots based on policies of the dialogue policy engine. Accordingly, the dialogue policy engine may further include one or more policies that map the predetermined actions to various acts and/or slots. Additionally, as illustrated in FIG. 2, the dialogue policy engine may include a replay buffer 227. The replay buffer 227 may be configured to track all experiences (e.g., conversations) and use that to update weights of the dialogue policy engine used in exploration. More specifically, the replay buffer accumulates recent experience tuples, breaks temporal correlations by random sampling, and helps to stabilize reinforcement learning dialogue policy training (i.e., of the dialogue policy engine).

Notably, in some embodiments, each slot may have two corresponding actions, one action to inform a value of the slot and a second action to request the value. Each slot informed by a policy (i.e., corresponding to a policy) of the dialogue policy engine may then be populated with a value by the state tracker. Additionally, each identified action (i.e., each action for which a corresponding act/slot has been received by the natural dialogue computer system) may be passed to the state tracker. Upon receiving the chosen action(s), the state tracker may populate any vacant placeholders. In an example, populating each slot and any vacant placeholders may result in a structured representation such as inform(theater=Cinema 8 in Lincoln Square). The natural language generator 228 may then be configured to translate the structured representation to a textual utterance. For instance, continuing the previous example, the natural language generator may translate/generate an audible textual utterance such as "This movie is playing tonight at Cinemark 8 in Lincoln Square." Accordingly, the natural dialogue computer system may be capable of receiving spoken utterances as input and generating contextually appropriate spoken utterances in response to the received utterances.

Currently, simple question answering bots (e.g., MICROSOFT CORTANA, AMAZON ALEXA, GOOGLE NOW, GOOGLE HOME, APPLE SIRI, and so forth) have been developed that are typically capable of carrying out only single-exchange conversations. As such, follow-up questions and/or follow-up comments (i.e., spoken utterances that are contextually relevant to a previous comment/question) as input to a conversation may not be understood by such bots. Such simple bots can be programmed with explicit policies, which approach may include several limitations. First, it may be difficult for such bots to determine an acceptable policy a priori. Second, the underlying dynamics of a problem/question/request faced by such bots may change over time, which can be difficult for such bots to discern.

For instance, a user may have a question about movies which includes an everchanging data base of available movies. Thus, reinforcement learning (RL), in which policies are learned through interaction with an unknown and possibly changing environment, has emerged as a popular alternative. Deep reinforcement learning (DRL) may further advance RL, as DRL combines the representational power of deep neural networks with the RL paradigm. To explore their environments, DRL systems typically employ an €-greedy heuristic. Given a state, a deep Q-network (DQN) predicts a value for each action. The dialogue policy engine chooses the action with the highest value with probability, and a random action with probability. The use of €-greedy heuristic has several advantages. For instance, it results in infinite exploration. When rewards are relatively frequent, such as points gained over the course of video game play, this strategy appears effective. However, in many reinforcement learning (RL) tasks, rewards are sparse. In these situations, a randomly exploring agent may never stumble upon a successful outcome (in feasible time).

For example, with respect to dialogue systems (e.g., the natural dialogue computer system 220), a primary reward signal may be sparse, while an action space may be large (i.e., a large number of possible actions to be performed by a given dialogue system), which comprise conditions under which €-greedy heuristics may often fail. As such, a randomly exploring Q-learner may never stumble upon a successful dialogue. Moreover, unlike the video game and board game domains, human-interacting dialogue systems incur significant real-world costs for failures. Accordingly, the principles described herein may speed up learning of such dialogue systems (e.g., the natural dialogue computer system 220) by improving the efficiency of exploration and by introducing a mechanism to jump-start a deep Q-learner, as further described herein. First, a technique for exploring via Thompson sampling by drawing Monte Carlo samples from a Bayes-by-Back Propagation Q neural network (BBQN) is described herein. Second, replay buffer spiking, a technique for jump-starting a deep Q-learner (whether utilizing BBQN or DQN), and used in conjunction with the first technique to further improve the efficiency of exploration, is also described herein. Notably, some background fundamentals of exploration and Q-Learning are first described for better understanding of the two aforementioned techniques.

Accordingly, some fundamentals of Deep Q-Learning are described herein, as Deep Q-Learning is a prominent way in which dynamic policy changes are currently performed by dialogue policy engines (e.g., a Deep Q-Learner). In particular, the dialogue policy engine 226 (e.g., an RL agent) may navigate a Markov decision process (MDP), and interact with the dialogue policy engine's environment over a sequence of discrete time steps. At each time-step t, the dialogue policy engine may observe current state $s_t \in S$, and choose some action $a_t \in A$ according to a policy $\pi$. The dialogue policy engine may then receive a reward $r_t$ and observe new state $s_{t+1}$, continuing the cycle until a given episode terminates. Here, S represents the set of all possible states, A defines the space of possible actions, and the policy $\pi$: $S \rightarrow A$ maps states to actions. In this description, there is an assumption that actions are discrete and that $|A|$ is finite. Under a policy $\pi$, and in a particular state s, the value of action a comprises an expected cumulative discounted reward (also referred to herein as a return):

$$Q^\pi(s, a) = \mathbb{E}\left[r_t + \sum_{i=1}^{T} \gamma^i r_{t+i}\right],$$

where $\gamma$ is a discount factor. An optimal policy is one whose Q-function uniformly dominates others. A value function of the Q-function, called the optimal value function, is denoted $Q^*$.

Given the optimal value function $Q^*$, at any time-step t, the optimal move is for the dialogue policy engine to choose action $a^* = \mathrm{argmax}_a Q^\pi(s,a)$. Thus, acting greedily with respect to the optimal value function is strictly as good or better than pursuing the current policy. Given this improved policy, the Q function can be updated. This approach will converge to a local optimum. As such, learning an optimal policy can be reduced to learning the optimal value function. In practice, the number of states may be intractably large, and the sample complexity of exploration can grow at least linearly with the number of states $|S|$ and the size of the action space $|A|$. Thus, most practical reinforcement learners approximate the Q function by some parameterized model $Q(s, a; \theta)$.

The definition of return (or reward) specifies a recursion: the value of the current state, action pair (s,a), depends upon the value of the successor state $s_{t+1}$ and the action chosen in that state. Accordingly, $$Q(s_t,a_t)=r_{t+1}+\gamma \max Q(s_{t+1},a^0),$$

for some discount factor $\gamma$. For a fixed policy, the value function can be iteratively improved by approximate value iteration. Experiences may be represented as tuples ($s_t$, $a_t$, $r_t$, $s_{t+1}$). In Q-learning, the value function (and, in turn, the greedy policy) may be improved by minimizing the squared error between the current prediction and the one-step look-ahead prediction:

$$L_i(\theta_i) = \mathbb{E}_{(s_t,a_t,r_t,s_{t+1}) \sim \rho(\cdot)}[(y_t - Q(s_t, a_t; \theta_i))^2],$$

for $y_t = r_t + \gamma \max_a Q(s_{t+1}, a; \theta_t)$ and for $\rho(\square)$ denoting the joint distribution of experiences under the current policy. Traditionally, the Q-function (or a Q-Learner) has been trained by stochastic approximation, estimating the loss on each experience as it is encountered, which yields the update:

$$\theta_{t+1} \leftarrow \theta_t - \alpha(y_t - Q(s_t, a_t; \theta_t)) \nabla Q(s_t, a_t; \theta_t).$$

Several techniques may improve the effectiveness of deep Q-learning. First, rather than training online, a buffer of experiences may be maintained (e.g., the replay buffer 227), such that training occurs on randomly selected mini-batches of experience. This technique, referred to as experience replay, may break up the tight coupling between the observed states (e.g., the current estimate of the value function) and the current policy. Second, the parameters $\theta^-$ may be periodically cached, such that stale parameters are used to compute training targets $y_t$. Other techniques such as double deep Q-learning and prioritized experience replay also be effective for enabling learning by the Q-function, but are not discussed further herein.

For simplicity, the principles described herein utilize the basic DQN model and focus on improving exploration. In order to expose the dialogue policy engine to a rich set of experiences, a strategy for exploration is employed. With respect to DQN, the €-greedy exploration heuristic, as described herein, is most often used. As such, the principles described herein improve upon greedy exploration strategies by using uncertainty information (in the predicted Q values) to make more intelligent exploration choices. More particularly, Bayes-by-Back Propagation (or Bayes-by-Backprop), a method for extracting uncertainty information from neural networks by maintaining a probability distribution over the weights in the network, may be used.

Notably, the principles described herein may focus particularly on multilayer perceptrons (MLPs) (i.e., feedforward neural networks composed entirely of fully connected layers without recurrent connections), however, other neural network types may also be utilized. A standard MLP for regression models P(y|x, w), parameterized by weights $w=\{W_l, b_l\}_{l=1}^L$, have the following architecture:

$$\hat{y} = W_L \varphi(W_{L-1} \ldots \varphi(W_1 x + b_1) + \ldots + b_{L-1}) + b_L,$$

for a network with L layers (L−1 hidden) and activation function φ (commonly sigmoid, tan h, or rectified linear unit (ReLU)). In standard neural network training, the weights w, given a dataset $D=\{x_i, y_i\}_{i=1}^N$, may be learned by maximum likelihood estimation (MLE) using some variant of stochastic gradient descent $W^{MLE}=\arg\max_w \log p(D|w)$. Frequently, such models may be regularized by placing priors on the parameters (or weights) w. The resulting optimization seeks the maximum a posteriori (MAP) assignment of $w^{MAP}=\arg\max_w \log p(w|D)$.

Both MLE and MAP assignments produce point estimates of w, and thus capture only the mode of the predictive distribution. However, to enable efficient exploration, it is preferable that a model be capable of quantifying uncertainty. Thus, a Bayesian treatment of neural networks learning a full posterior distribution over the weights, p(w|D), may be used. Problematically, however, p(w|D) may be intractable. Accordingly, the potentially intractable posterior may be approximated by a variational distribution q(w|θ), wherein q may be Gaussian with diagonal covariance. Each weight $w_i$ may then be sampled from a univariate Gaussian distribution parameterized by mean $\mu_i$, and standard deviation $\sigma_i$. To ensure that all $\sigma_i$ remain strictly positive, $\sigma_i$ may be parameterized with the softplus function $\sigma_i = \log(1+\exp(\rho_i))$, giving variational parameters $\theta=\{(\mu_i, \rho_i)\}_{i=1}^D$ for D-dimensional weight vector w.

Notably, the true posterior is both multi-modal (owing to symmetry among the nodes) and intractable. There is no reason to believe that the true posterior exhibits conditional independence between every pair of two weights. As such, this is only an approximation in a very narrow sense. Nonetheless, it can prove useful in practice. These parameters may be learned by minimizing the Kullback-Liebler (KL) divergence between the variational approximation q(w|θ) and the posterior p(w|D):

$$\theta^* = \underset{\theta}{\operatorname{argmin}} KL[q(w|\theta)||p(w|\mathcal{D})]$$

$$= \underset{\theta}{\operatorname{argmin}} \int q(w|\theta) \log \frac{q(w|\theta)}{p(w)p(\mathcal{D}|w)} dw$$

$$\underset{\theta}{\operatorname{argmin}} KL[q(w|\theta)||p(w)] - \mathbb{E}_{q(w|\theta)}[\log p(\mathcal{D}|w)]$$

The expression minimized may be termed as the variational free energy. Assuming Gaussian error, the rightmost term is simply the expected square loss (i.e., the likelihood of the data given the weights). Sampling from q, the cost function is f(D, θ)=log q(w|θ)−log p(w)−log p(D|w). The variational parameters θ may by identified by gradient descent using a reparametrization technique. In particular, the loss may be differentiated with respect to the variational parameters θ, but the loss depends upon the random vector w~q(w|θ). This problem may be overcome by expressing w as a deterministic function of θ, g(η, θ), where η is a random vector. When g and noise distribution p(η) are chosen such that p(η)dη=q(w|θ)dw, the optimization objective can be expressed equivalently as an expectation over η. In an example, η may be a noise vector drawn from D-dimensional standard normal $N(0,I)^D$. In such cases, w=g(η, θ)=μ+log(1+exp(ρ)) ⊙ η, where ⊙ is the element-wise product.

Techniques for training the system (e.g., the natural dialogue computer system 220, and more specifically the dialogue policy engine 226) are now introduced. To approximate the Q-function, a Bayes-by-Backprop MLP, as further described herein, may be used. When exploring the environment, actions may be chosen using Thompson sampling. To choose actions by Thompson sampling, one forward pass may be performed through the network with a single Monte Carlo sample of the weights w~q(w|θ), choosing whichever action, for that choice of the weights, corresponds to a higher value of the Q function.

Initially, one forward pass through the network may be performed with a single Monte Carlo sample of the weights w~q(w|θ). The one forward pass includes choosing an action for a given weight that corresponds to the highest value of the Q-function. The variational parameters may be initialized to match the prior. Accordingly, μ is initialized to the zero vector 0 and ρ to match the variance of the prior. Notably, unlike with conventional neural networks, the weights need not be assigned randomly, as sampling breaks symmetry. As a consequence of the initialization, the agent (e.g., the dialogue policy engine) explores uniformly at random from the outset. Over the course of training, as the buffer fills, the mean squared error starts to dominate the objective function and the variational distribution moves further from the prior.

When freezing a current network (i.e., Q-network), all variational parameters of a target network (i.e., a network based on what has previously been learned) may also be frozen. Then, during training, for each mini-batch, one Monte Carlo sample of the weights may be drawn from the frozen target network's variational distribution to construct the targets. One Monte Carlo sample may then be drawn from the current network's variational distribution for the forward pass. On the backwards pass, a gradient update may be applied to the current variational parameters. Notably, if one sample is drawn per example, random number generation becomes a rate-limiting operation during training. By sampling once per mini-batch, the computational expense is amortized. Using this approach, Bayes-by-Back Propagation Q Network (BBQN) and DQN training speeds are roughly equivalent.

Accordingly, instead of using a single value for weights, the principles described herein utilize probabilistic distributions for each weight during training, thus incorporating uncertainty information that allows for more intelligent exploration choices made by an agent (e.g., the dialogue policy engine 226, as further described herein. Notably, both a current network and a target network are described that allow for dynamically updating the probabilistic distribution of weights of the current network based on the target network. More specifically, probabilistic distributions for weights are used to calculate potential output distributions of values, which output values are used to determine an action to be taken. As such, training may be used to narrow the probabilistic distribution of the weights over time to thereby narrow the probabilistic distribution of the outputs, thus giving more certainty to the system (e.g., the natural dialogue computer system 220) of the appropriate action to take based on what has been identified during a conversation.

However, while Thompson sampling is a useful strategy for exploration, Thompson sampling does not necessarily handle reward sparsity well at the beginning of learning. Any agent (e.g., the dialogue policy engine 226) exploring completely at random may never stumble upon a first reward in time to guide further exploration. As such, replay buffer spiking (RBS) may be used, as briefly described herein. More specifically, in the case of dialogue, a few successful dialogues can be produced manually. Such successful dialogues, or experiences, can then be used to pre-fill the experience replay buffer. Accordingly, a rule-based agent (e.g., a naive rule-based agent or dialogue policy engine) may be constructed, followed by harvesting experiences from some number of rule-based dialogues, and adding those to the replay buffer, which process comprises RBS. Regardless of whether BBQN or DQN is being utilized for exploration/discovery purposes, RBS may effectively improve exploration (e.g., by more quickly obtaining rewards, more quickly mapping more quickly actions to particular received input, more quickly determining appropriate probabilistic distributions, and so forth).

Accordingly, the replay buffer 227 (which tracks all previous experiences (e.g., conversations) to allow those experiences to be used to update weights of the dialogue policy engine used in exploration) may be jump started upon initialization of exploration using RBS. More specifically, RBS may be used to initialize data of the replay buffer such that the initial data is reasonable to start exploration. Upon performing RBS, exploration performed using the initially useful data may allow for quantifying uncertainty to thereby collect further useful data and avoid reward sparsity.

Figure 3:
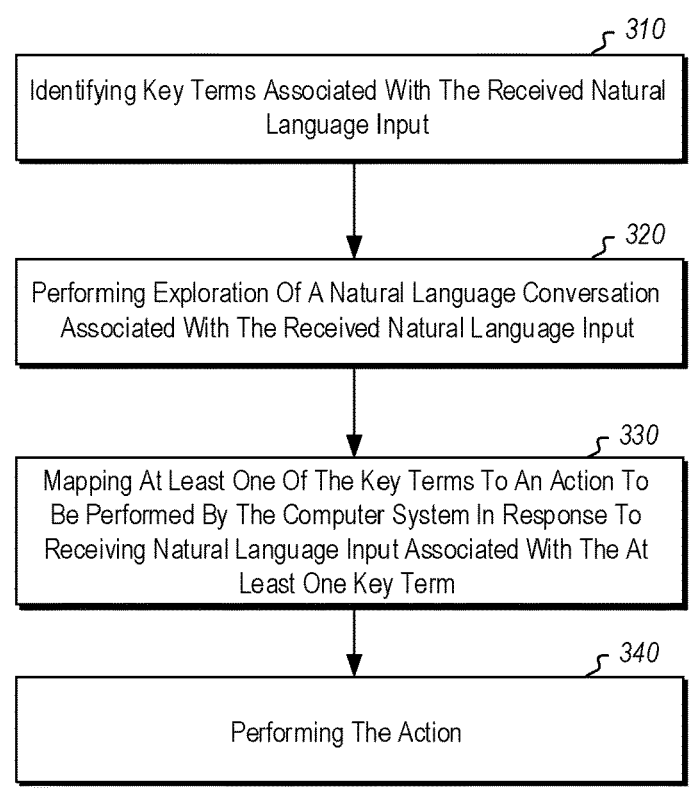
FIGS. 3 illustrates a flowchart of a method for performing efficient exploration of natural language conversations associated with dialogue policy learning.

FIG. 3 illustrates a flowchart of a method 300 for performing efficient exploration of natural language conversations associated with dialogue policy learning. The method 300 may include performing exploration of a natural language conversation in response to receiving natural language input. For instance, natural language input may be received at the natural dialogue computer system 220 from user entity 210. The received natural language input may then cause the natural dialogue computer system to perform exploration (e.g., by performing Thompson sampling using Monte Carlo samples from a BBQN) of the environment of the natural dialogue computer system (and more specifically, the dialogue policy engine). The method 300 may further include identifying key terms associated with the received natural language input by utilizing the structured representation (Act 310). For instance, the natural language understanding engine 222 may identify key terms and convert raw text (i.e., the received natural language input) of key terms into a particular structured representation (e.g., a tuple comprising an act and a collection of (slot=value) pairs).

The method 300 may also include mapping at least one of the key terms to an action to be performed by the computer system in response to receiving natural language input associated with the at least one key term (Act 320). For instance, in response to receiving natural language associated with booking movie tickets, the natural dialogue computer system may map one or more particular words received as input (i.e., as part of the request to book tickets) to booking movie tickets. Notably, such mapping may be performed using a probabilistic distribution, as further described herein. Notably, Act 320 and Act 330 may each comprise exploration. The method may further include performing the action (Act 340). For instance, using the example of booking movie tickets, the natural dialogue computer system may actually book the movie tickets and inform the user entity 210 of such.

In this way, instead of using a single value for weights, the principles described herein utilize probabilistic distributions for each weight during training, thus incorporating uncertainty information that allows for more intelligent exploration choices made by an agent (e.g., the dialogue policy engine 226), as further described herein. Notably, both a current network and a target network are described that allow for dynamically updating the probabilistic distribution of weights of the current network based on the target network. More specifically, probabilistic distributions for weights are used to calculate potential output distributions of values, which output values are used to determine an action to be taken. As such, training may be used to narrow the probabilistic distribution of the weights over time to thereby narrow the probabilistic distribution of the outputs, thus giving more certainty to the system (e.g., the natural dialogue computer system 220) of the appropriate action to take based on what has been identified during a conversation.

Additionally, a replay buffer (which tracks all previous experiences (e.g., conversations) to allow those experiences to be used to update weights of the dialogue policy engine used in exploration) may be jump started upon initialization of exploration using RBS. More specifically, RBS may be used to initialize data of the replay buffer such that the initial data is reasonable to start exploration. Upon performing RBS, exploration performed using the initially useful data may allow for quantifying uncertainty to thereby collect further useful data and avoid reward sparsity.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage media having stored thereon computer-executable instructions that are executable by the one or more processors to cause the computer system to perform efficient exploration of natural language conversations associated with dialogue policy learning of the computer system, the computer-executable instructions including instructions that are executable to cause the computer system to perform at least the following:
   in response to receiving natural language input, perform at least the following:

identifying key terms associated with the received natural language input, wherein identifying the key terms includes converting raw text of the received natural language input into a structured representation;

performing exploration of a natural language conversation associated with the received natural language input, the exploration comprising at least the following:

based on the received natural language input, determining a plurality of potential actions that are to be performed by the computer system in response to the received natural language input by performing Thompson sampling using Monte Carlo samples that are associated with the received natural language input;

mapping at least one of the key terms to an action selected from among the plurality of potential actions to be performed by the computer system in response to receiving the natural language input associated with the at least one key term, wherein the mapping is performed using a probabilistic distribution; and performing the action.

2. The computer system of claim 1, wherein exploration is performed by Thompson sampling using Monte Carlo samples from a Bayes-by-Back Propagation Q Network (BBQN).

3. The computer system of claim 1, wherein key terms comprise at least one of an act or a key=value pair.

4. The computer system of claim 1, wherein the probabilistic distribution is dynamically learned, such that identified key terms of received natural language input are more accurately mapped to actions to be performed by the system.

5. The computer system of claim 4, wherein the probabilistic distribution is dynamically learned using periodically created target networks.

6. The computer system of claim 1, wherein exploration is performed in an offline environment, such that natural language input is received from a simulated user.

7. The computer system of claim 1, wherein exploration is performed in an online environment, such that natural language input is received from an end user.

8. The computer system of claim 1, wherein a replay buffer is utilized by the computer system to track what has occurred in previous conversations.

9. The computer system of claim 8, wherein replay buffer spiking that comprises pre-filling the replay buffer with one or more successful dialogues is performed.

10. A method, implemented at a computer system that includes one or more processors, for performing efficient exploration of natural language conversations associated with dialogue policy learning, the method comprising:

in response to receiving natural language input, performing at least the following:

identifying key terms associated with the received natural language input, wherein identifying the key terms includes converting raw text of the received natural language input into a structured representation;

performing exploration of a natural language conversation associated with the received natural language input, the exploration being performed using Thompson sampling from a Bayes-by-Back Propagation Q Network (BBQN), the exploration comprising at least the following:

mapping at least one of the key terms to an action to be performed by the computer system in response to receiving the natural language input associated with the at least one key term, wherein the mapping is performed using a probabilistic distribution; and performing the action.

11. The method of claim 10, wherein the exploration is performed by Thompson sampling using Monte Carlo samples from the BBQN.

12. The method of claim 10, wherein key terms comprise at least one of an act or a key=value pair.

13. The method of claim 10, wherein the probabilistic distribution is dynamically learned, such that identified key terms of received natural language input are more accurately mapped to actions to be performed by the system.

14. The method of claim 13, wherein the probabilistic distribution is dynamically learned using periodically created target networks.

15. The method of claim 10, wherein exploration is performed in an offline environment, such that natural language input is received from a simulated user.

16. The method of claim 10, wherein exploration is performed in an online environment, such that natural language input is received from an end user.

17. The method of claim 10, wherein a replay buffer is utilized by the computer system to track what has occurred in previous conversations.

18. The method of claim 17, wherein replay buffer spiking that comprises pre-filling the replay buffer with one or more successful dialogues is performed.

19. A computer system comprising:

one or more processors; and one or more hardware storage devices having stored thereon computer-executable instructions that are executable by the one or more processors to perform efficient exploration of natural language conversations associated with dialogue policy learning, the computer-executable instructions including instructions that are executable to cause the computer system to perform at least the following:

in response to receiving natural language input, perform at least the following:

identifying key terms associated with the received natural language input, wherein identifying the key terms includes converting raw text of the received natural language input into a structured representation;

performing exploration of a natural language conversation associated with the received natural language input, wherein the exploration is performed by Thompson sampling using Monte Carlo samples from a Bayes-by-back Propagation Q Network (BBQN), the exploration comprising at least the following: exploration comprising at least the following:

mapping at least one of the key terms to an action to be performed by the computer system in response to receiving natural language input associated with the at least one key term, wherein mapping is performed using a probabilistic distribution; and performing the action.

* * * * *